Figure 1:
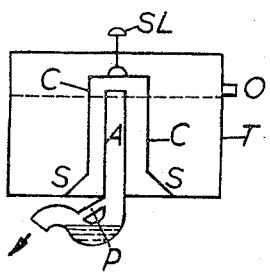
Figure 2:
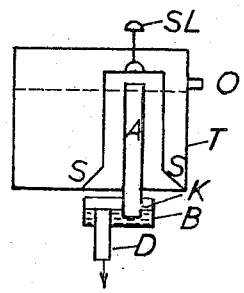
Figure 3:
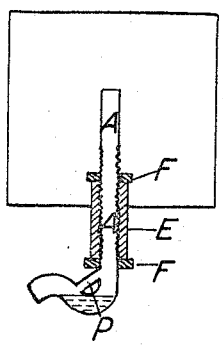
Figure 4:
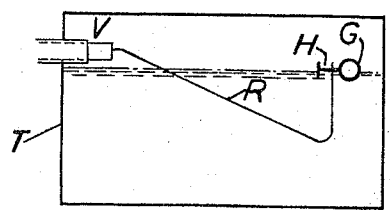
Figure 5:
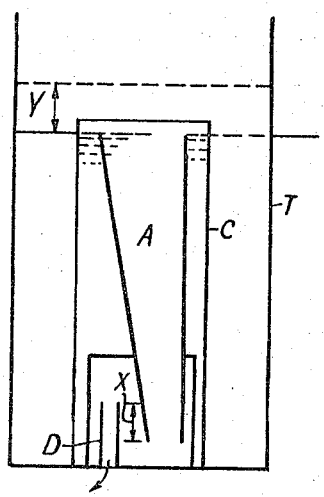

United States Patent Office 3,332,088
Patented July 25, 1967

3,332,088
DEVICE FOR DISCHARGING A MEASURED QUANTITY OF LIQUID, FOR EXAMPLE FROM A FLUSHING CISTERN
Eruchshaw Nariman Contractor, 30 Nepeansea Road, Bombay 6, India
Filed Oct. 16, 1963, Ser. No. 316,568
6 Claims. (Cl. 4—48)

This invention relates to a device for discharging a measured quantity of liquid, for example, from a flushing cistern for water closets and the like.

It is an object of this invention to deliver a measured quantity of liquid for any purpose. A further object of the invention is to adjust the discharge of liquid according to requirements, i.e., either a smaller quantity or a larger quantity may be discharged in each operation of the cistern.

According to this invention a device for discharging a measured quantity of liquid comprises a cistern adapted to be filled with the required quantity of liquid, a cup placed inverted in the cistern on three or more legs, a discharge pipe within the cup passing through the bottom of the cistern, the top end of the pipe reaching near the base of the inverted cup and slightly above the liquid level in the cup when the cistern is filled, a water seal at the discharge end of the pipe and a starting lever fixed to the base of the cup, with an arrangement to expel displaced air from the cup when the cistern is being filled.

According to a feature of the invention the cistern is adapted to be filled with the required quantity of liquid by means of a ball float valve. The said valve is adjustable to vary the quantity of liquid to be filled in the cistern.

According to another feature of the invention the top end of the discharge pipe is slightly above the liquid level in the cup when filled to the required extent, so that when the cup is raised liquid contained in the cistern rushes out through the pipe. The height of the pipe within the cistern is adjustable according to the quantity of liquid to be discharged.

A further feature of the invention is that the water seal is provided by bending the lower end of the discharge pipe to S-shape and filling the bent portion with water, an additional pipe being provided connecting vertical portion of the discharge pipe with the bent portion, above the level of water in the bend to allow air from inside the cup to be expelled when the cistern is being filled.

According to an alternative arrangement a separate chamber is provided below or inside the cistern to carry the water seal and serve as an air trap, and the lower end of the discharge pipe dips into the water in the trap, a separate pipe being inserted in the trap to expel water, a hole or opening being also provided in the discharge pipe just above the water level in the trap, to allow air from inside of the cup to be expelled when the cistern is being filled.

In a modification of the invention the height of the discharge pipe within the cistern is made adjustable by making the discharge pipe in two pieces, one lying within the cistern and the other outside, and connecting the two pieces by check nuts to a coupling welded to the bottom of the cistern. The liquid in the cistern is adjusted to a level according to the adjusted height of the pipe by adjusting the float valve, to discharge different measured quantities of liquid.

The invention also provides a flushing cistern for discharging a measured quantity of water comprising a cistern adapted to be filled with the required quantity of water, a cup placed inverted in the cistern on three or more legs, a discharge pipe within the cup passing through the bottom of the cistern, the top end of the pipe reaching near the base of the inverted cup and slightly above the water level in the cup when the cistern is filled, a water seal at the discharge end of the pipe and a starting lever fixed to the base of the cup with an arrangement to expel displaced air from the cup when the cistern is being filled.

The invention will now be described with reference to the drawings accompanying the complete specification, in which:

FIG. I shows a flushing cistern with an arrangement according to this invention, FIG. II shows a flushing cistern with an alternative arrangement, FIG. III shows a modification in which the discharge pipe is adjustable, other parts being omitted, FIG. IV shows separately the ball float valve with the other parts of the cistern omitted, and FIG. V shows a further embodiment of this invention.

It may here be mentioned that the drawings are merely illustrative and are not in any way restrictive.

In these drawings, for the sake of clarity, the cisterns illustrated in FIGS. I to III and V do not show the ball float valve which is, however, shown separately in FIG. IV. This ball float valve is fitted in all the cisterns illustrated in FIGS. I to III and V and operates in the conventional way, i.e., the ball float droops down as the water is discharged from the cistern and opens the valve at the inlet, and it is raised as the cistern is again filled up and closes the valve when the required level of water is reached in the cistern. But the construction of the valve is slightly altered to make the ball adjustable to enable the cistern to be filled up to different levels according to requirement. In this construction the rod R carrying the ball slopes downwards from the valve V at the inlet of water to the cistern and is bent upwards to carry the ball G at its upper extremity by means of a thumb screw H which adjusts the height of the ball.

In these figures, T shows the cistern, O is the overflow pipe, C is the inverted cup which encloses the discharge pipe A and rests on legs S, and SL shows the starting lever which is attached to the base of the cup, pipe P (FIGS. I and III) and hole K (FIG. II).

In FIG. I, the lower end of the pipe A is bent to S-shape which bend carries a water seal to serve as an air trap. In FIG. II, a separate air trap is provided by a chamber B lying below the bottom of the cistern, which carries water in which dips the discharge pipe A. Another pipe D is inserted in the chamber B at the bottom which expels water when the cistern is put into operation by the starting lever SL. In FIG. III, coupling E is welded to the bottom of the cistern T and the discharge pipe A is fixed to the coupling by a check nut F, and the S-shaped bend is fixed at the bottom of the coupling by another check nut F. The discharge pipe, in this case, is screw-threaded where it fits the coupling so that its height in the cistern can be adjusted to discharge different measured quantities of water from the cistern according to requirements. The pipe P in FIGS. I and III and the hole K in FIG. II are provided so that once the tank is discharged, and as the water fills up in the tank T the pipe P and the hole K allow the air contained in cup C to seep through the atmosphere. The diameters of the pipe P and the hole K are such that they are big enough to allow a gradual escape of air, but at the same time, they are not big enough to destroy the low pressure created by lifting the starting level SL. The pipe P is so placed (at an angle) that no water can remain in the pipe P when the tank is not discharging the liquid. The hole K in FIG. II must be inside the air trap and over the water level in the air trap. The hole should be preferably on that side of pipe A which is on the other side of pipe D as shown in FIG. II.

The water seal is, therefore, so provided that although t cannot destroy the low pressure in the pipe it allows air to be expelled as the cistern is being filled. As for the efficient functioning of the cistern the water level in the cup should be just below the top of pipe A. For this purpose as shown by dotted lines in FIGURES I and II, the the ball float is so adjusted that the level of water in the cistern and inside the cup is just under the top end of the pipe A.

In FIG. II the hole K wil not be necessary to discharge the air trapped inside the cup C and the pipe A, if the lower end of pipe A is so adjusted that about ¼" of this end dips into the water contained in the air trap. In this arrangement the air trapped forces its way out through the air trap as the pressure increases inside the cup C and the pipe A. It is found by experiment that enough pressure is exerted to expell the air. The great advantage is that the air trap is a one way trap whereby it allows discharge of trapped air inside the cup C and the pipe A, but does not permit entry of air through the bottom of the pipe A.

In operation, when the starting lever SL is raised, the cup C is lifted from the base of the cistern and a low pressure is created in the space of the cup above the top of the discharge pipe A. Due to the creation of this low pressure water rushes into pipe A and a syphon action is started till the water level in the cistern falls down to the open mouth of the cup when air rushes into the cup and the discharge stops. When the water level in the cistern falls the ball float droops down and the valve at the water inlet opens to fill the cistern again to the required level. The water seal at the S-shaped bend of the pipe A prevents any air coming into the pipe from its discharge end, thus starting the syphon action. The same effect is produced in the arrangement illustrated in FIG. II (and FIG. V) where a separate air trap with water seal is provided to prevent incoming air.

In the modification illustrated in FIG. III the height of the discharge pipe is adjusted by screwing it in or screwing out of the coupling E provided in the cistern. When smaller quantity of water is required to be discharged the height is lowered, and at the same time the ball float is so adjusted that the inlet is closed earlier before the full level of water is reached in the cistern, as, always, for efficient functioning the water level in the cup should be just below the top end of the pipe A.

In a further alternative, the FIG. V shows an arrangement whereby a high discharge rate is obtainable. In this arrangement, the hole K is not provided. The pipe A is made into a cone shape and the bottom of the pipe A overlaps the top of pipe D much more than it does in FIG. II. The overlapping is shown as the distance X. In this arrangement the air trapped inside the cup C is discharged as in FIG. II (without the hole K) but when the level of water comes to the top of the cone A, inside the cup C, the level of the water outside the cup C will be higher by the distance Y. The distance Y will be proportionate to the distance X. There will be a slight pressure of air inside the cone A and inside the top of the cup C, when the tank is ready to discharge. This pressure is released and a low pressure is created when the cup C is lifted by the starting lever SL and the syphon action is immediately started.

However, the pipe A need not be conical right up to the top of the cup but only up to about mid-way whereafter it proceeds as a cylindrical body.

The device according to this invention can be used for low height flushing cisterns. It supplies a measured quantity of water, and, although its application in relation to a flushing cistern has been described in this specification it can as well be used in other apparatus where delivery of measured quantity of liquid is required.

The tank as shown in FIG. V can be used either as a hand operated flushing cistern, or as an automatic cistern, if required.

Having now particularly described and ascertained the invention in the foregoing specification, what I claim is:

1. A device for discharging a measured quantity of liquid comprising a cistern adapted to be filled with the required quantity of liquid, an airtight inverted cup in the cistern on at least three legs, a discharge pipe within the cup passing through the botton of the cistern, the top end of the pipe reaching near the base of the inverted cup and slightly above the liquid level in the cup when the cistern is filled to the required extent, a water seal at the discharge end of the pipe below the cistern, an air discharge bleed means associated with said water seal for bleeding air from beneath said inverted cup when the cistern is being filled, and a starting lever fixed to the base of the cup.

2. A device as claimed in claim 1 in which said water seal is an S-shaped pipe, and said air discharge bleed means comprises a small tube between the top portions of the downwardly curved bight of the S-shaped pipe.

3. A device for discharging a measured quantity of liquid comprising a cistern adapted to be filled with the required quantity of liquid, an airtight inverted cup in the cistern on at least three legs, a discharge pipe within the cup passing through the bottom of the cistern, the top end of the pipe reaching near the base of the inverted cup and slightly above the liquid level in the cup when the cistern is filled to the required extent, a water seal at the discharge end of the pipe below the cistern, said water seal comprising a separate chamber to serve as an air trap, the lower end of the discharge pipe being adapted to dip into water in said trap, a separate pipe being inserted in said chamber to discharge water, the top of said separate pipe being at a level just slightly above the bottom of said discharge pipe, displaced air from the cup being displaced through said discharge pipe, through the thin layer of water in which the end of the discharge pipe is dipped, and through the separate pipe when the cistern is being filled, and a starting lever fixed to the base of the cup.

4. A device for discharging a measured quantity of liquid comprising a cistern adapted to be filled with the required quantity of liquid, an airtight inverted cup in the cistern on at least three legs, a discharge pipe within the cup and extending toward the bottom of the cistern, the top end of the pipe reaching near the base of the inverted cup and slightly above the liquid level in the cup when the cistern is filled to the required extent, a water seal at the discharge end of the pipe, said water seal comprising a separate chamber to serve as an air trap, the lower end of the discharge pipe being adapted to dip into the water in said trap and having a hole near the bottom, a separate pipe being inserted in the chamber to discharge water, the top of said separate pipe being at a level between the bottom of said discharge pipe and said hole, and a starting lever fixed to the base of the cup, displaced air from the cup being displaced through said discharge pipe, hole and separate pipe when the cistern is being filled.

5. A device as claimed in claim 4 in which said discharge pipe within the cup passes through the bottom of the cistern and the water seal at the discharge end of the pipe is below the cistern.

6. A device for discharging a measured quantity of liquid comprising a cistern adapted to be filled with the required quantity of liquid, an airtight inverted cup in the cistern on at least three legs, a discharge pipe which is adjustable in height and being in two pieces, one lying within the cistern and the other outside, a coupling welded to the bottom of the cistern being located within the cup and passing through the bottom of the cistern, check nuts connecting the two pieces of the discharge pipe to said coupling, the top end of the pipe reaching near the base of the inverted cup and slightly above the liquid level in the cup when the cistern is filled to the required extent, a water seal at the discharge end of the pipe and a starting lever fixed to the base of the cup, and an arrangement to expel displaced air from the cup when the cistern is being filled.

References Cited

UNITED STATES PATENTS

| | | | |
|---|---|---|---|
| 638,740 | 12/1899 | Morrison | 137—426 X |
| 1,500,417 | 7/1924 | Mueller | 137—426 |

FOREIGN PATENTS

| | | |
|---|---|---|
| 19,675/29 | 2/1930 | Australia. |
| 6,165/32 | 9/1932 | Australia. |
| 3,582 | 1881 | Great Britain. |
| 1,284 | 1898 | Great Britain. |

M. CARY NELSON, *Primary Examiner.*

E. FEIN, *Assistant Examiner.*